(12) United States Patent
Smemo et al.

(10) Patent No.: US 9,005,071 B2
(45) Date of Patent: Apr. 14, 2015

(54) FLEXIBLE AND SCALABLE MULTI-RATIO PLANETARY TRANSMISSION

(75) Inventors: Alfred S. Smemo, Dubuque, IA (US); Kyle K. McKinzie, Altamont, KS (US)

(73) Assignee: Deere & Company, Moline, IL (US)

( * ) Notice: Subject to any disclaimer, the term of this patent is extended or adjusted under 35 U.S.C. 154(b) by 329 days.

(21) Appl. No.: 13/359,761

(22) Filed: Jan. 27, 2012

(65) Prior Publication Data
US 2013/0196812 A1 Aug. 1, 2013

(51) Int. Cl.
*F16H 57/10* (2006.01)
*B60K 17/08* (2006.01)
*F16H 3/66* (2006.01)
*F16H 37/08* (2006.01)

(52) U.S. Cl.
CPC ........... *B60K 17/08* (2013.01); *Y10T 29/49464* (2015.01); *F16H 2200/203* (2013.01); *F16H 3/66* (2013.01); *F16H 37/0813* (2013.01); *F16H 2200/0004* (2013.01); *F16H 2200/0039* (2013.01); *F16H 2200/0043* (2013.01); *F16H 2200/2007* (2013.01); *F16H 2200/201* (2013.01); *F16H 2200/2038* (2013.01); *F16H 2200/2041* (2013.01)

(58) Field of Classification Search
CPC .................. F16H 2200/004; F16H 2200/2007; F16H 2200/201; F16H 2200/203
USPC ......... 475/275, 276, 280, 282, 284, 286, 311, 475/313, 317, 319, 323, 325
See application file for complete search history.

(56) References Cited

U.S. PATENT DOCUMENTS

| | | | |
|---|---|---|---|
| 4,070,927 A * | 1/1978 | Polak | 475/286 |
| 4,178,813 A | 12/1979 | Smemo | |
| 6,491,600 B1 | 12/2002 | Smemo et al. | |
| 7,166,053 B2 * | 1/2007 | Bucknor et al. | 475/276 |
| 7,946,947 B2 * | 5/2011 | Kato et al. | 475/282 |
| 8,088,033 B2 * | 1/2012 | Boss et al. | 475/282 |
| 8,303,457 B2 * | 11/2012 | Doi et al. | 475/286 |
| 8,353,801 B2 * | 1/2013 | Hart et al. | 475/276 |
| 8,388,488 B2 * | 3/2013 | Phillips et al. | 475/280 |

* cited by examiner

Primary Examiner — Tisha Lewis
(74) Attorney, Agent, or Firm — Taft Stettinius & Hollister, LLP; Stephen F. Rost

(57) ABSTRACT

The present disclosure provides a multi-ratio scalable transmission system for multiple vehicle configurations. The system includes an input disposed along a first axis configured to receive torque from a variable speed propulsion device and an output disposed along a second axis and coupled to the input. The system further includes a selectably engageable clutch coupled between the input and output and a planetary unit coupled to both the input and the output, where the planetary unit includes at least one planetary gearset and a brake. The system is configurable based on a particular vehicle configuration such that the first axis and second axis can be coaxial or non-coaxial.

14 Claims, 3 Drawing Sheets

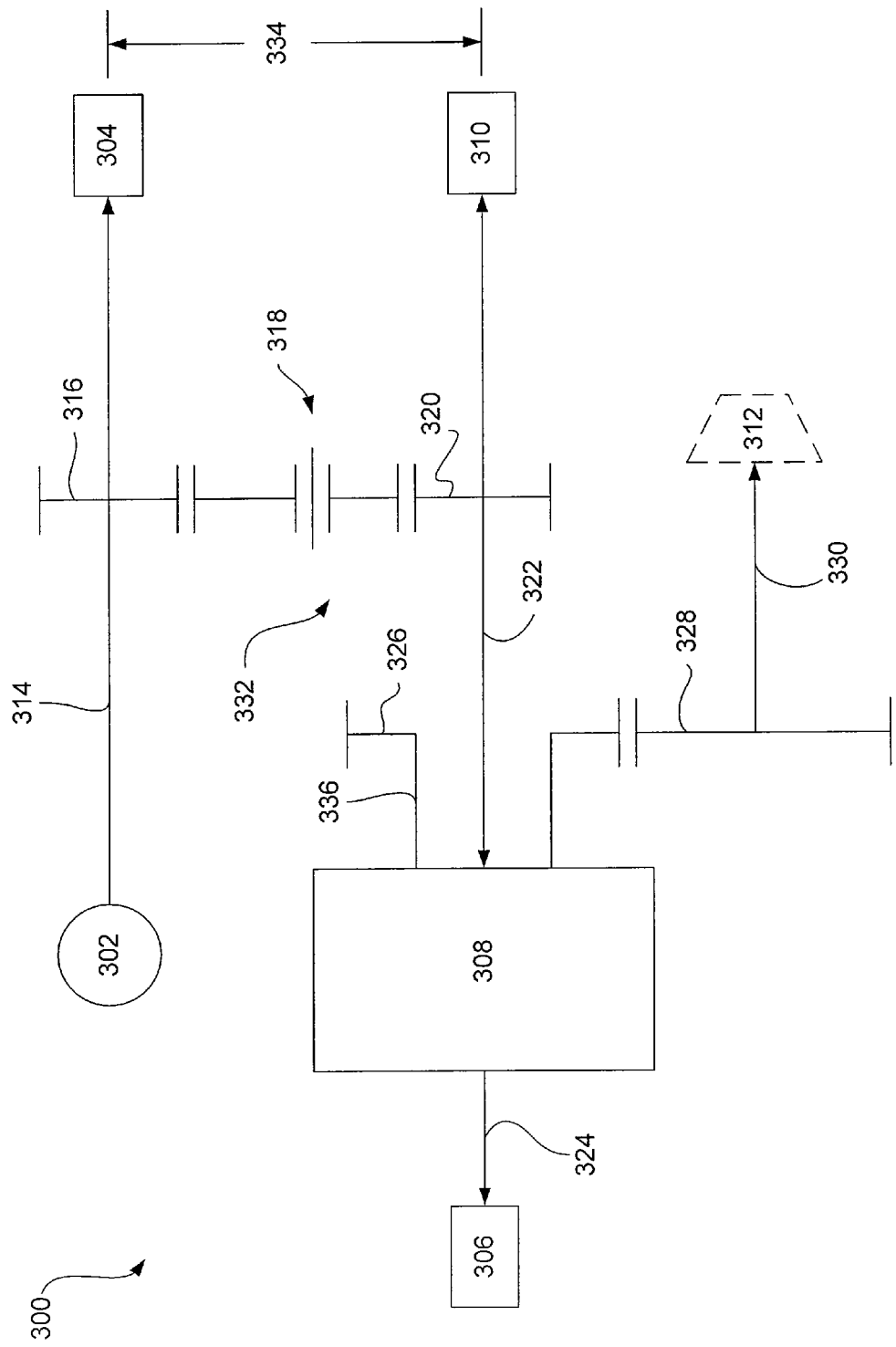

FLEXIBLE AND SCALABLE MULTI-RATIO PLANETARY TRANSMISSION

FIELD OF THE INVENTION

The present invention relates to a transmission for a work vehicle, and in particular, to a flexible arrangement of multi-ratio planetary transmission adaptable to different forms and sizes of work vehicles.

BACKGROUND OF THE INVENTION

Work vehicles, particularly those used in construction and forestry applications, can include a constant or near constant speed engine. Depending on the desired application, the vehicle input (e.g., engine, motor, etc.) can include finite speed and torque ranges. These vehicles can have a plurality of different configurations and setups which depend on the nature of the vehicle. However, these vehicles also have multi-speed and multi-torque needs for achieving desirable fuel efficiency and performance. Therefore, a multi-ratio, shiftable transmission or the like is required to augment the input drive device and provide an appropriate spectrum of vehicle ground speeds and tractive effort while optimizing efficiency.

With there being a large number of work vehicles in the construction and forestry industries, there can be a unique setup for each vehicle regardless of whether the input drive device is electric, hydraulic, pneumatic, or other known inputs. Depending on the application, each vehicle may have individual ground speed and/or tractive effort requirements as well. As such, individual transmission designs are provided for each vehicular setup. In other words, one transmission design may work for a wheel loader, but not for a motor grader. Likewise, a different transmission design may work for a motor grader, but not for a wheel loader. These designs may have individual parts, either large or small, depending on the size of the vehicle. In many instances, the individual parts differ between the different transmission designs.

A need therefore exists to provide a flexible and scalable multi-ratio transmission that can be adaptable to any known and future vehicle configuration. It is desirable to provide a transmission that can achieve power in and out at the same end, power in and out at different ends, and an input shaft that runs axially through the design for power take-off applications. It is further desirable to provide a transmission that can be coupled to a variety of transfer gear/drive configurations to meet any requirement of a vehicular package. The logic used in any one given design can be used regardless of machine size or configuration.

SUMMARY

In an exemplary embodiment of the present disclosure, a multi-ratio scalable transmission system is provided for multiple vehicle configurations. The system includes an input disposed along a first axis configured to receive torque from a variable speed propulsion device and an output disposed along a second axis and coupled to the input. The system further includes a selectably engageable clutch and a planetary unit coupled to the input and the output. The planetary unit includes at least one planetary gearset and a brake. The system is configurable based on a particular vehicle configuration such that the first axis and second axis can be coaxial or non-coaxial.

In one aspect, the system can include a first shaft and a second shaft, the input being coupled to the first shaft and the output being coupled to the second shaft, wherein the second shaft is concentric with the first shaft. In another aspect, the input is disposed at the same side of the system as the output. In yet another aspect, the system can include a drop gear set, the drop gear set including a first output gear coupled to the output of the planetary unit, a second output gear coupled to the output of the system, and an idler gear coupled therebetween.

The planetary unit can include a first planetary gearset including a first sun gear, a first carrier, and a first ring gear; a second planetary gearset including a second sun gear, a second carrier, and a second ring gear; a first brake coupled to the first ring gear; and a second brake coupled to the second ring gear. The input can be coupled to the first sun gear, second sun gear, or first ring gear. The output can be coupled to the second carrier.

In a related aspect, the planetary unit can include a first planetary gearset including a first sun gear, a first carrier, and a first ring gear, the first sun gear being coupled to a first brake; a second planetary gearset including a second sun gear, a second carrier, and a second ring gear; a third planetary gearset including a third sun gear, a third carrier, and a third ring gear; and a second brake coupled to the second ring gear and a third brake coupled to the third ring gear. The input can be coupled to the first ring gear, second sun gear, or third sun gear and the output can be coupled to the third carrier.

In another embodiment, a scalable multi-ratio transmission system is provided for different vehicle configurations. The system can include an input disposed at an input side of the transmission; an output coupled to the input and disposed at an output side of the transmission; a selectably engageable clutch coupled between the input and output; and a planetary unit coupled to the input and output and including a planetary gearset and a brake. The selectably engageable clutch can provide for a 1:1 ratio through the transmission. In a first configuration, the input side can be disposed opposite the output side. In a second configuration, the input side can be the same as the output side.

In the first configuration, the input can be collinear with the output. In the second configuration, the input can be offset from the output by a distance. In one aspect, the input is coupled to a first shaft and the output is coupled to a second shaft; wherein, the second shaft is concentric with the first shaft. In another aspect, the system can include a drop gear set, the drop gear set including a first output gear coupled to the output of the planetary unit and a second output gear coupled to the output of the system. A third gear can be coupled between the first output gear and the second output gear.

In a further aspect, the planetary unit can include a first planetary gearset including a first sun gear, a first carrier, and a first ring gear; a second planetary gearset including a second sun gear, a second carrier, and a second ring gear; a first brake coupled to the first ring gear; and a second brake coupled to the second ring gear; wherein the input is coupled to the first sun gear, second sun gear, or first ring gear; further wherein the output is coupled to the second carrier.

In a related aspect, the planetary unit can include a first planetary gearset including a first sun gear, a first carrier, and a first ring gear, the first sun gear being coupled to a first brake; a second planetary gearset including a second sun gear, a second carrier, and a second ring gear; a third planetary gearset including a third sun gear, a third carrier, and a third ring gear; and a second brake coupled to the second ring gear and a third brake coupled to the third ring gear; wherein, the input is coupled to the first sun gear, first ring gear, second sun gear, or third sun gear; further wherein the output is coupled to the third carrier.

In a different embodiment, a method is provided of configuring a universally scalable transmission package to a particular vehicle package. The method includes identifying an input and output configuration of the vehicle package; determining the number of gear ratios desired for the particular vehicle package; arranging the input of the transmission about a first axis to couple with the input of the vehicle; arranging the output of the transmission about a second axis to couple with the output of the vehicle, where the second axis can be coaxial or non-coaxial with the first axis; and coupling a planetary unit to the input and output of the transmission.

In one aspect of this embodiment, the method can include coupling a drop gear set between the transmission output and an output of the planetary unit. In another aspect, the method can include producing the size and number of teeth of each gear in the drop gear set to achieve a desired drop distance between the first axis and second axis. In a further aspect, the method includes coupling the transmission input to a first shaft and the transmission output to a second shaft such that the second shaft is concentric with the first shaft. In this embodiment, the arranging steps can comprise configuring the transmission input and output to the same side of the transmission. The method can also include coupling the input of the transmission to a power take-off unit of the vehicle package. Alternatively, the method can include coupling the output of the transmission to an axle of the vehicle package.

BRIEF DESCRIPTION OF THE DRAWINGS

The above-mentioned aspects of the present invention and the manner of obtaining them will become more apparent and the invention itself will be better understood by reference to the following description of the embodiments of the invention, taken in conjunction with the accompanying drawings, wherein:

FIG. 3 is a schematic of a flexible and scalable transmission with multiple configurations.

Corresponding reference numerals are used to indicate corresponding parts throughout the several views.

DETAILED DESCRIPTION

The embodiments of the present invention described below are not intended to be exhaustive or to limit the invention to the precise forms disclosed in the following detailed description. Rather, the embodiments are chosen and described so that others skilled in the art may appreciate and understand the principles and practices of the present invention.

In this present disclosure, the following embodiments provide a flexible and scalable transmission system that can desirably be fitted to any powered vehicle, particularly to those used in the construction and forestry industries (e.g., four wheel-drive loader, motor grader, log skidder, etc.). The system is flexibly designed such that input(s) and output(s) can be configured in multiple locations based on the design of a particular vehicle. For instance, in a vehicle where it is desirable for an input and output to be disposed on the same side of the transmission, the embodiments of the present disclosure can be designed to achieve this functionality. Alternatively, it is possible to provide an input on one side and an output on an opposite side of the transmission. For power take-off (PTO) applications, the transmission system can be flexibly designed to include a through shaft in which a first shaft is concentric to a second shaft. Here, the input of the transmission may be coupled to one of the shafts and the output to the other. The system can also be packaged with a drop gearset such that the input and output are disposed along centerlines offset from one another by a distance.

The transmission systems of the present disclosure can be mounted to multiple types of transfer gears or drive configurations to achieve multiple vehicle packages. In this manner, a first vehicle having a first set of requirements can be packaged with a corresponding transmission system, whereas the transmission system can be packaged differently to meet the requirements of a second vehicle.

The system can also be scaled to meet the requirements of different size vehicle packages. A large vehicle may require a larger distance between an input centerline and output centerline, whereas a smaller vehicle may require a shorter distance. The size of gears and number of teeth is one way to configure the transmission system to meet the requirements of both.

Figure 1:
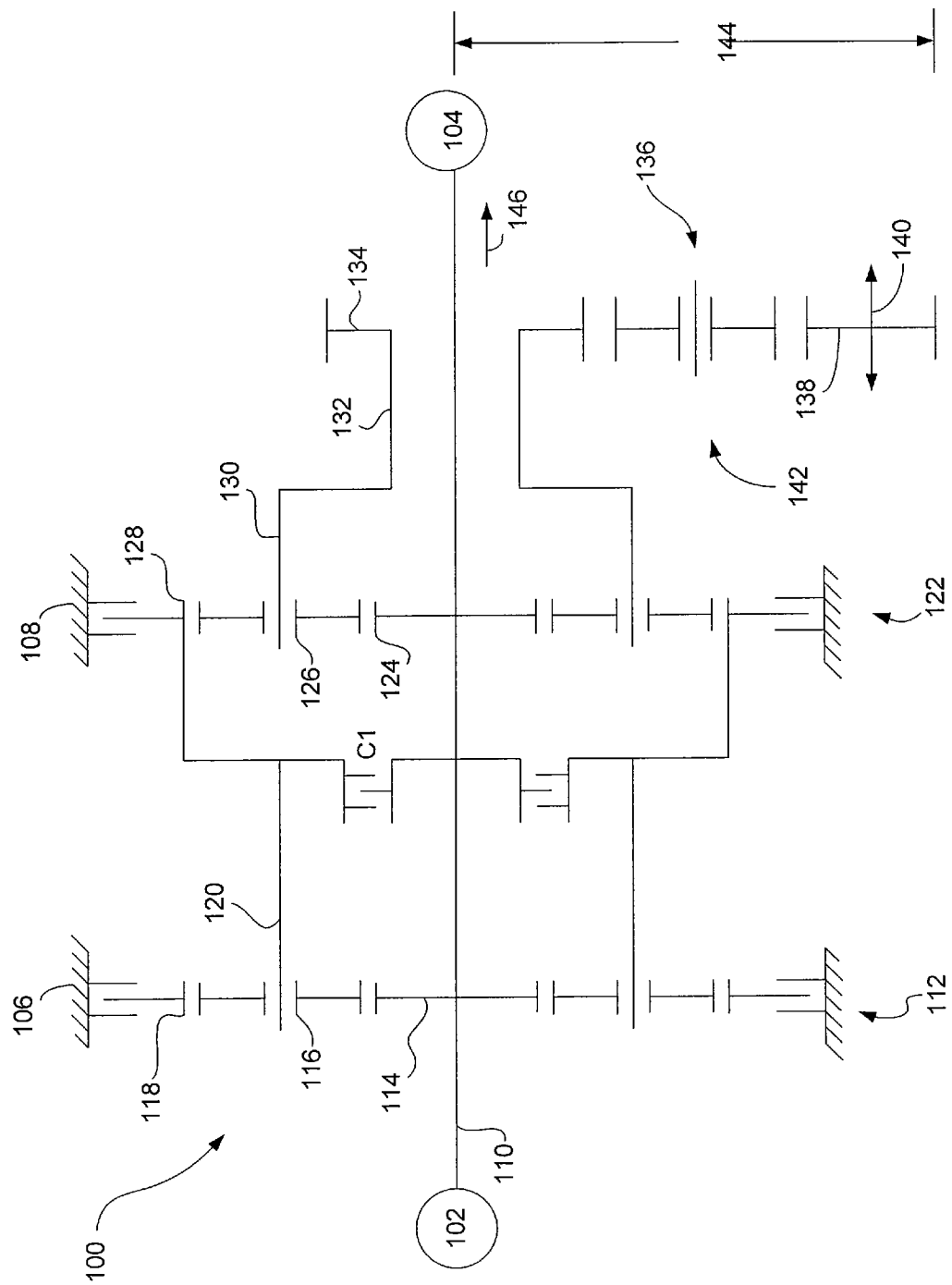
FIG. 1 is a schematic of a transmission configuration capable of achieving three different gear ratios.

To achieve the flexibility and scalability desired in the present disclosure, the layout of the vehicle is first ascertained. For example, the input and output configuration of the vehicle can be identified to design the corresponding input and output of the transmission to meet these requirements. It may also be important to determine the number of gear ratios desired for a particular vehicle. As is shown in FIG. 1, a three ratio transmission can be configured with a planetary unit including two brakes, two planetary gearsets, and a selectably engageable clutch. Alternatively, in FIG. 2, a four ratio transmission can be configured with a planetary unit including three brakes, three planetary gearsets, and a selectably engageable clutch. The layout of the planetary gearsets and selectably engageable clutch can be determined for achieving the desired gear ratios. For instance, in one embodiment, it may be desired to couple the transmission input to a sun gear, whereas in a different embodiment, it may be desired to couple the transmission input to a ring gear.

The input of the transmission can be arranged about a first axis to couple with the vehicle input. Likewise, the output of the transmission can be arranged about a second axis to couple with the vehicle output. The first axis and second axis can be coaxial, i.e., the same axis. In a drop distance configuration, the first axis and second axis may be offset from one another. For example, it may be desirable to couple the transmission output to a spiral bevel pinion gear for connecting to a differential. This particular configuration is shown in FIG. 3. With the ability to adapt the transmission system to any desired vehicle layout, the present disclosure is able to achieve a transmission system that can be packaged with any known or unknown vehicle setup.

Referring to FIG. 1, an illustrative embodiment is provided of a three-speed configuration (i.e., a transmission system capable of achieving three different gear ratios) that is flexible and adaptable to any vehicular setup. In this embodiment, the transmission configuration 100 can include a first I/O 102 and a second I/O 104. In this disclosure, "I/O" refers to input/output. Here, an input 102 be configured at one side of the transmission and an output 104 can be configured at an opposite side. Depending on the vehicle layout, the input and output can be switched (i.e., the input 104 is disposed on the right side of the transmission and the output 102 on the left side). For purposes of FIG. 1, the input 102 will be described relative to the left side of the configuration 100 and the output 104 will be described relative to the right side of the configuration 100. The output 104 can be used as a power take off (PTO) to provide auxiliary machine function directly from the input of the transmission. In this arrangement, torque can pass through the transmission from input 102 to output 104 along a direction indicated by arrow 146.

The transmission output can be offset and defined along a direction identified by arrow 140. Here, a drop gearset 142 can be incorporated into the design such that the output centerline (e.g., defined along arrow 140) is offset from the input centerline by a drop distance 144. A driveline yoke (not shown) can be mounted to the output 140 to transfer torque to an axle. As will be described below, a first output gear 134 is coupled to the output of a planetary unit. With a drop gearset, the first output gear 134 is coupled to a second output gear 138 with an optional idler gear 136 disposed therebetween. In other configurations, additional output and idler gears can be coupled between the first output gear 134 and second output gear 138. The second output gear 138 can then be coupled to a drive yoke, an axle, a PTO, or other desired output component.

The drop distance 144 can also be customized for a particular vehicle setup. For a smaller drop distance, the size of the first output gear 134, idler gear 136, and second output gear 138 can be sized smaller to reduce the distance 144. For a larger drop distance 144, however, the first output gear 134, idler gear 136, and second output gear 138 can be sized larger (e.g., larger diameters, more gear teeth, etc.) to achieve a greater drop distance 144.

As also shown in FIG. 1, the drop gearset output 140 can provide an output to either the left or right side as shown by the arrow. This again is customizable for particular vehicles which may need an output to both the left and right sides of the drop gearset 142.

As mentioned, FIG. 1 is an illustrative embodiment of a flexible and scalable transmission system that can achieve three different gear ratios. To do so, a planetary unit is disposed between the transmission input and output. In FIG. 1, the planetary unit can be coupled to an output 132, which may also be the same as the transmission output when no drop gearset is required. The planetary unit includes a first planetary gearset 112 and a second planetary gearset 122. The first planetary gearset 112 includes a first sun gear 114, a first carrier 120 having a plurality of pinion gears 116, and a first ring gear 118. Similarly, the second planetary gearset 122 includes a second sun gear 124, a second carrier 130 having a plurality of pinion gears 126, and a second ring gear 128. The planetary unit also includes a first brake 106 and a second brake 108. A selectably engageable clutch, C1, is configured between the first and second planetary gearsets. In this embodiment, the input 102 includes a shaft 110 through which torque is transferred through the transmission system 100. The first sun gear 114 and second sun gear 124 can be coupled (e.g., splined) to the shaft 110. In a "straight-through" transmission system, the input 102 and output 132 are disposed on the same axial centerline, which in FIG. 1, is defined along the shaft 110.

In this particular embodiment, a first gear ratio can be achieved by applying or holding the second brake 108. In doing so, the second brake 108 can hold the second ring gear 128 from rotation. As shown, the second ring gear 128 and first carrier 120 are coupled to one another. In other words, output from the first carrier 120 is transferred to the second ring gear 128. However, with the second ring gear 128 and first carrier 120 being held by the second brake 108, a simple planetary reduction torque scheme is achieved. Input torque from the input 102 passes through the second sun gear 124 and is output by the second carrier 130. The second carrier 130, which can be referred to as an output carrier, can be coupled to the first output gear 134 via output connection 132 (e.g., a shaft, spline, etc.) when a drop gearset 142 is needed. As those skilled in the art understand, the gear ratio can be arranged based on the number of gear teeth on the second sun gear 124 and second ring gear 128 and thus a particular output torque requirement in a first gear ratio can be achieved. The output 132 can also be directly mounted to a drive axle when a drop gearset is not required.

A second gear ratio, which provides a lower output torque than first gear ratio, is achieved by holding the first brake 106. In doing so, the first brake 106 holds or locks the first ring gear 118 from rotation. In this gear ratio, a torque split scheme is achieved as a portion of the input torque from the input 102 passes through the first planetary gearset 112 and a remaining portion of the input torque passes through the second planetary gearset 122. In particular, the first portion of input torque passes through the first sun gear 114 and out the first carrier 120. The amount of torque output from the first carrier 120 is transferred to the second ring gear 128 via a solid connection therebetween. The second, or remaining, portion of input torque is received by the second sun gear 124. The second carrier 130 again outputs torque to the first output gear 134 in this second gear ratio. The second gear ratio, similar to the first gear ratio, can be configured based on the number of gear teeth on each of the gears in the first and second planetary gearsets.

A third gear ratio, which provides less output torque than the first gear ratio and second gear ratio, can be achieved by applying the selectably engageable clutch, C1. The brakes and clutches can be controlled electronically, hydraulically, pneumatically, or by other known means. As the clutch C1 is applied, the shaft 110 is "clutched" to the second ring gear 128 such that reaction torque is transferred to the second ring gear 128. Here, input torque passes through the second sun gear 124 and is output through the second carrier 130. There is approximately zero input torque passing through the first planetary gearset, so the third gear ratio can be approximately 1:1. Therefore, in a non-limiting example, a first gear ratio can be approximately 5:1, a second gear ratio approximately 2.5:1, and the third gear ratio approximately 1:1. These different ratios are only provided as an example, and are not intended to be limiting. Of course, the ratios can be adjusted by changing the size and number of gear teeth of any one of the gears in the planetary unit.

As described above, it is possible to have the system input and output disposed along the same axis but on the same side of the transmission. In this configuration, an output shaft 132 is concentric with an input shaft 110. If reference number 104 represents the transmission input and 132 represents the transmission output, input torque from a motor, prime mover, or other variable speed propulsion device passes through the input shaft 110 and, depending on the gear ratio, torque passes through the planetary unit as described above. Output torque is transferred from the second carrier 130 through an integral connection to the output shaft 132. The first output gear 134 can be splined or integrally coupled to the output shaft 132 to transfer output torque to a driveline yoke or other output connection via a drop gearset 142. In this particular configuration, the output shaft 134 can include a hollow passage through its centerline so that the input shaft 110 can pass therethrough. The input shaft 110 and output shaft 134 are coaxial in this arrangement.

Figure 2:
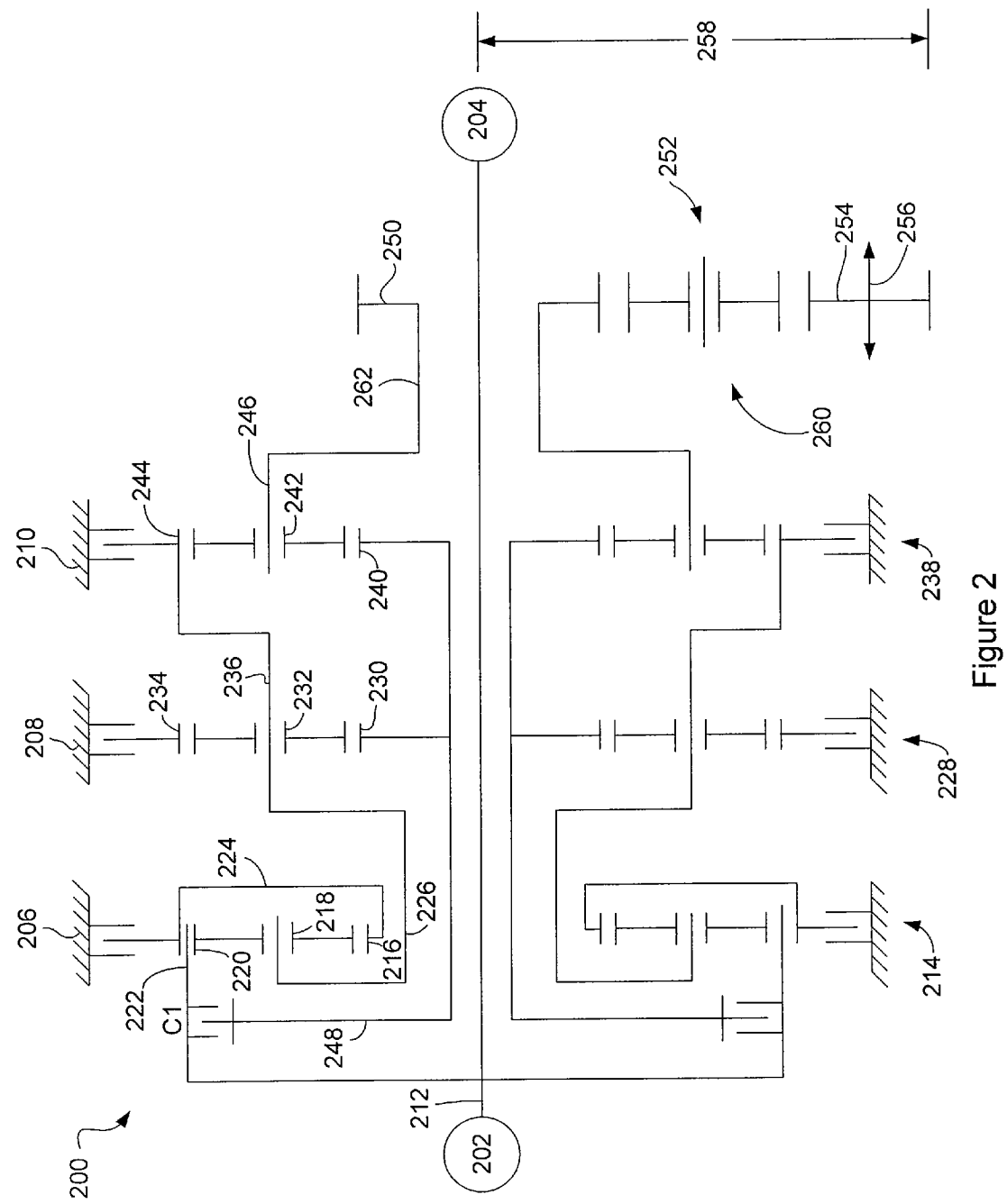
FIG. 2 is a schematic of a transmission configuration capable of achieving four different gear ratios.

It may also be desirable to provide an additional gear ratio to the transmission system. In FIG. 2, a four gear ratio transmission system 200 is illustrated. In this embodiment, a first I/O 202 is shown on the left side of the system 200 and a second I/O 204 is shown on the right side. The first and second I/O can be either an input or an output to the system 200. Similar to the three-speed embodiment 100 of FIG. 1, the four-speed system 200 can also include a drop gearset 260 in which an output 256 to the system 200 is disposed offset from an input centerline. In FIG. 2, the first and second I/O are axially disposed about an input centerline defined along shaft 212. The drop gearset output 256 can be offset from this input centerline by a drop distance 258. To achieve this offset, the drop gearset can include a first output gear 250, an idler gear 252, and a second output gear 254. As shown by the arrows in FIG. 2, the drop gearset output 256 can provide an output to either side of the system (e.g., left or right of the drop gearset 260). In one instance, it may be desirable to couple a driveline yoke (not shown) to one or both sides of the output 256. Other alternatives are possible depending on the requirements of a particular vehicle.

In one embodiment, the first I/O 202 can be an input and the second I/O 204 can be an output (e.g., for a PTO drive unit) to the system 200. Here, the input 202 and output 204 are coaxial and disposed along the same centerline. The transmission system 200 is referred to as a "straight through transmission" since the input can be arranged from either side of the transmission. In a different embodiment, the first I/O 202 can be the output for a PTO application and the second I/O can be the input. Alternatively, the input and output can be disposed on the same side of the transmission system by incorporating an outer, hollow output shaft 262 concentric with an internal input shaft 212.

The transmission system 200 in FIG. 2 can achieve four different gear ratios by having a planetary unit disposed between the system input and output. The planetary unit can include a first planetary gearset 214, a second planetary gearset 228, and a third planetary gearset 238. The planetary unit can also include a first brake 206, a second brake 208, and a third brake 210. The planetary unit can include an output 262 which, in some embodiments, is also the transmission output (viz., when there is no drop gearset). The first planetary gearset 214 includes a first sun gear 216, a first carrier 226 having a plurality of pinion gears 218, and a first ring gear 220. The second planetary gearset 228 includes a second sun gear 230, a second carrier 236 having a plurality of pinion gears 232, and a second ring gear 234. Similarly, the third planetary gearset includes a third sun gear 240, a third carrier 246 having a plurality of pinion gears 242, and a third ring gear 244. The planetary unit can also include a selectably engageable clutch, C1.

To illustrate the power flow through the planetary unit, the system input will be referenced as the first I/O 202 and the system can have an option PTO output from the second I/O 204. The input 202 is coupled to a shaft 212, as shown. In a first gear ratio, input torque is received by the system input 202 and transferred to the shaft 212. The third brake 210 is held and the selectably engageable clutch is applied to achieve this first gear ratio. As such, with the third brake 210 held, the third ring 244 is also held by the brake. In this embodiment, the third ring gear 244 is coupled to the second carrier 236, which is coupled to the first carrier 226. Input torque therefore is transferred through the applied C1 clutch and is received by the third sun gear 240. With no torque passing through the first planetary gearset 214 or second planetary gearset 228, a simple planetary reduction scheme is achieved in the first gear ratio. The third sun gear 240 receives the input torque and the torque is output through the third carrier 246.

A second gear ratio, which provides a lower output torque than first gear ratio, is achieved by holding the second brake 208 and applying the selectably engageable clutch, C1. The second brake 208 holds the second ring gear 234, and similar to the second gear ratio in the three-speed embodiment of FIG. 1, a torque split scheme is achieved. With C1 applied, A first portion of input torque passes from the system input 202 to the second sun gear 230 and a second portion is transferred to the third sun gear 240. The first portion received by the second sun gear 230 is output by the second carrier 236. The second carrier 236 is coupled to the third ring gear 244, so torque transferred from the second carrier 236 is received by the third ring gear 244. The torque received by the third ring gear 244 and third sun gear 240 are then output by the third carrier 246 to the system output 262. The output 262 of the third carrier 246 can be coupled to the first output gear 250, which can be integrally coupled or splined to the third carrier 246 or output 262. Alternatively, the third carrier 246 can be coupled to or be part of an output shaft 262 to which the first output gear 250 is coupled.

A third gear ratio, which is smaller than the first gear ratio and second gear ratio, is achieved by holding the first brake 206 and applying the selectably engageable clutch, C1. The first ring gear 220 is coupled to the system input 202 via connection 222. Further, the third sun gear 240 is also coupled to the system input 202 via the applied C1 clutch, and thus a two-way torque split is achieved in the third gear ratio. The first sun gear 216 is grounded via the first brake 206. The first carrier 226 is coupled to the second carrier 236 via a solid connection (e.g., shaft, spline, etc.) and so torque output from the first carrier is received by the second carrier 236. A solid coupling or solid connection is herein defined to be a clutch-less non-intermittent linkage for torque transfer between components. As described above, the second carrier 236 outputs torque to third ring gear 244. Thus, torque received by the third sun gear 240 and third ring gear 244 is output through the third carrier 246.

A fourth gear ratio, which is smaller than the first gear ratio, second gear ratio, and third gear ratio, can be achieved by holding the first brake 206 and second brake 208. In doing so, the input 202 is coupled to the first ring gear 220. Torque therefore passes through the first ring gear 220 and is reacted by the first sun gear 216, which is grounded by the first brake 206. Torque is then output via the first carrier 226. Output torque from the first carrier 226 is thus transferred to and received by the second carrier 236. With the second brake 208 locked, the second ring gear 234 is also held. Torque received by the second carrier 236 is then output to the second sun gear 230 and third ring gear 244. The second sun gear 230 transfers torque to the third sun gear 240, and torque received by the third ring gear 244 (via the second carrier 236) and third sun gear 240 (via the second sun gear 230) is output through the third carrier 246. The effect is counteracting torques which reduces the overall output torque from the system 200. In other words, a torque split takes effect between the second planetary gearset 228 and the third planetary gearset 238 to produce the fourth gear ratio.

Therefore, in a non-limiting example, a first gear ratio can be approximately 5:1, a second gear ratio approximately 2.5:1, a third gear ratio approximately 1.3:1, and a fourth gear ratio approximately 0.90:1. These different ratios are only provided as an example, and are not intended to be limiting. Of course, the ratios can be adjusted by changing the size and number of gear teeth of any one of the gears in the planetary unit.

In FIG. 3, an exemplary modular transmission configuration 300 is shown. This is one of many different packages in which the transmission can be arranged for a particular vehicle. In this configuration 300, an input 302 can be mounted to a motor, prime mover, engine, or other variable speed propulsion device. The input 302 can also be coupled to one end of a first shaft 314 and a PTO output 304 can be coupled to the opposite end. As such, torque received by the input 302 can be used to drive the PTO output 304.

This configuration 300 also includes a second shaft 322 offset from the first shaft 314. A drop gearset 332 couples the first shaft 314 and second shaft 322 to one another. The drop gearset 332 can include a first gear 316 coupled to the first shaft 314 and a second gear 320 coupled to the second shaft 322. An idler gear 318 can be disposed therebetween to complete the drop gearset 332. If the first shaft 314 defines a first centerline and the second shaft 322 defines a second centerline, the drop gearset defines a distance therebetween referred to as the drop distance 334, or offset distance. This distance 334 can be adjusted and set at any desired value by designing the size and number of gear teeth of the first and second gears 316, 320 and idler gear 318.

At one end of the second shaft 322 is a second PTO output 310. In this configuration, the first PTO output 304 and second PTO output 310 are offset from one another by the drop distance 334. At the opposite end of the second shaft 322 is a planetary unit 308. The planetary unit 308 can include the same components as shown and described in FIGS. 1 and 2. Namely, the planetary unit 308 can include at least one brake, planetary gearset, and selectably engageable clutch. Torque can also be passed through the planetary unit and used to drive a PTO output at position 306. A third shaft 324 can coupled the PTO output 306 and the planetary unit 308. Torque can also be output from the planetary unit 308 to a third gear 326, which is coupled to the planetary unit 308 via a shaft 336 or other connection.

The third gear 326 can be coupled or splined to a fourth gear 328. The fourth gear 328 can be coupled to a shaft 330 or other connection at one end thereof. Another output 312 is coupled to the opposite end of the shaft 330. The output 312 can be coupled to a spiral bevel pinion gear, for example, which can be attached to a differential. Alternatively, the output 312 can be mounted directly or indirectly to a drive axle.

The embodiment of FIG. 3 is just one of many different embodiments that can be packaged for a particular vehicle. Depending on requirements of the vehicle, e.g., gear ratios, PTO outputs, performance requirements, etc., the layout of the transmission system can be customized for any set of requirements. Included in this is designing the size and number of gear teeth of gears incorporated in the design. The system can be a single-side input/output system, a straight through system, or a system that includes a drop gearset. As such, numerous vehicles in the construction and forestry industries, and vehicles outside thereof, can be packaged with a transmission system designed to meet performance and efficiency needs of the vehicle.

While exemplary embodiments incorporating the principles of the present invention have been disclosed hereinabove, the present invention is not limited to the disclosed embodiments. Instead, this application is intended to cover any variations, uses, or adaptations of the invention using its general principles. Further, this application is intended to cover such departures from the present disclosure as come within known or customary practice in the art to which this invention pertains and which fall within the limits of the appended claims.

The invention claimed is:

1. A multi-ratio scalable transmission system for multiple vehicle configurations, comprising:
an input disposed along a first axis configured to receive torque from a variable speed propulsion device;
an output disposed along a second axis and coupled to the input;
a selectably engageable clutch coupled between the input and output; and
a planetary unit coupled to the input and the output, the planetary unit including a brake and a first planetary gearset including a first sun gear, a first carrier, and a first ring gear, the first sun gear solidly coupled to the first ring gear;
wherein the system is configurable based on a particular vehicle configuration such that the first axis and second axis can be coaxial or non-coaxial;
further wherein the input is disposed at the same side of the system as the output.

2. The system of claim 1, further comprising a drop gear set, the drop gear set including at least a first output gear coupled to an output of the planetary unit and a second output gear coupled to the output of the system.

3. The system of claim 1, wherein the planetary unit comprises:
the first planetary gearset including the first sun gear, the first carrier, and the first ring gear, the first sun gear solidly coupled to the first ring gear, and the first sun gear being coupled to a first brake;
a second planetary gearset including a second sun gear, a second carrier, and a second ring gear;
a third planetary gearset including a third sun gear, a third carrier, and a third ring gear; and a second brake coupled to the second ring gear and a third brake coupled to the third ring gear;
wherein, the input is coupled to the first sun gear, first ring gear, second sun gear or third sun gear; further wherein, the output is coupled to the third carrier.

4. A scalable multi-ratio transmission system for different vehicle configurations, comprising:
an input disposed at an input side of the transmission;
an output coupled to the input and disposed at an output side of the transmission;
a shaft with a first input/output connection on the output side of the transmission and a second input/output connection disposed opposite the output side of the transmission;
a selectably engageable clutch coupled between the input and output; and
a planetary unit coupled to the input and output and including a planetary gearset and a brake;
wherein:
in a first configuration, the second input/output connection is the input and the input is collinear with the output, and the input side is disposed opposite the output side; and
in a second configuration, the first input/output connection is the input and the input is offset from the output by a distance, where the input side is the same as the output side.

5. The system of claim 4, further comprising a drop gear set, the drop sear set including a first output gear coupled to the output of the planetary unit and a second output gear coupled to the output of the system.

6. The system of claim 5, further comprising a third gear coupled between the first output gear and the second output gear.

7. The system of claim 4, wherein the planetary unit comprises:

a first planetary gearset including a first sun sear, a first carrier, and a first ring gear, the first sun gear being coupled to a first brake;

a second planetary gearset including a second sun gear, a second carrier, and a second ring gear;

a third planetary gearset including a third sun gear, a third carrier, and a third ring gear; and a second brake coupled to the second ring gear and a third brake coupled to the third ring gear;

wherein, the third sun gear is solidly coupled to the second sun gear, and a clutch couples the first ring gear to both the second and third sun gears;

further wherein, the output is coupled to the third carrier.

8. A method of configuring a universally scalable transmission package to a particular vehicle package, comprising:

identifying an input and output configuration of the vehicle package;

determining the number of gear ratios desired for the particular vehicle package;

arranging a transmission input about a first axis to couple with the input of the vehicle, the transmission input having a first input coupling on a first side of the transmission and a second input coupling on a second side opposite the first side;

arranging a transmission output about a second axis to couple with the output of the vehicle, where the second axis can be coaxial or non-coaxial with the first axis;

coupling a planetary unit to the transmission input and output; and coupling a drop gear set between the transmission output and an output of the planetary unit.

9. The method of claim 8, further comprising scaling the size and number of teeth of each gear in the drop gear set to achieve a desired drop distance between the first axis and second axis.

10. The method of claim 8, wherein the transmission output is on the first side and the first input coupling receives a torque from the input of the vehicle.

11. The system of claim 1, wherein the planetary unit comprises:

the first planetary gearset including the first sun gear, the first carrier, and the first ring gear;

a second planetary gearset including a second sun gear, a second carrier, and a second ring gear;

a third planetary gearset including a third sun gear, a third carrier, and a third ring gear;

a first brake coupled to the first ring gear;

a second brake coupled to the second ring gear;

a third brake coupled to the third ring gear; and wherein, the third ring gear is solidly coupled to both the second carrier and the first carrier and the output is coupled to the third carrier.

12. The system of claim 11 wherein the third brake locks the third ring gear, the second carrier, and the first carrier.

13. The system of claim 1, further comprising a first shaft and a second shaft, the input being coupled to the first shaft and the planetary unit being coupled to the both the first shaft and the second shaft, wherein the second shaft is concentric with the first shaft.

14. The system of claim 4, wherein the planetary unit comprises:

a first planetary gearset including a first sun gear, a first carrier, and a first ring gear;

a third planetary gearset including a third sun gear, a third carrier, and a third ring gear;

a first brake coupled to the first ring gear; and a third brake coupled to the third ring gear;

wherein, the input is solidly coupled to first ring and the input is coupled to third sun gear via a clutch;

further wherein, the output is coupled to the third carrier.

* * * * *